United States Patent [19]

Huang

[11] Patent Number: 5,799,338
[45] Date of Patent: Sep. 1, 1998

[54] SWIMMING GOGGLES

[76] Inventor: Ann Huang, No. 398, Chian Ping 8th St., An Ping District, Tainan City, Taiwan

[21] Appl. No.: 748,537

[22] Filed: Nov. 13, 1996

[51] Int. Cl.⁶ ........................................ A61F 9/02
[52] U.S. Cl. .................................... 2/428; 2/452
[58] Field of Search ................... 2/428, 430, 452, 2/426, 439, 440, DIG. 11; 351/43, 155, 156

[56] References Cited

U.S. PATENT DOCUMENTS

| | | | |
|---|---|---|---|
| 3,143,739 | 8/1964 | Beuchat | 2/428 |
| 4,564,960 | 1/1986 | Nishiyama | 2/452 |
| 4,966,451 | 10/1990 | Corral et al. | 351/43 |
| 5,019,000 | 5/1991 | Stephens | 351/43 |
| 5,303,428 | 4/1994 | Pernicka | 2/428 X |
| 5,406,340 | 4/1995 | Hoff | 2/452 X |

*Primary Examiner*—Peter Nerbun
*Attorney, Agent, or Firm*—Morton J. Rosenberg; David I. Klein; Jun Y. Lee

[57] ABSTRACT

A pair of swimming goggles includes two frames, two rigid lenses respectively received in the frames, a strap, and two clamping blocks each having a bore. Each frame includes a slot defined in an outer side thereof. Each end of the strap is extended through the associated block, wound through the associated slot, and then again extended through the associated clamping block, thereby forming an upper strap section and a lower strap section which are located at a position above the ears of a user. The first end and the second end of the strap are securely attached to a buckle, thereby allowing adjustment of the length of the strap in response to the shape of the head of the user.

4 Claims, 6 Drawing Sheets

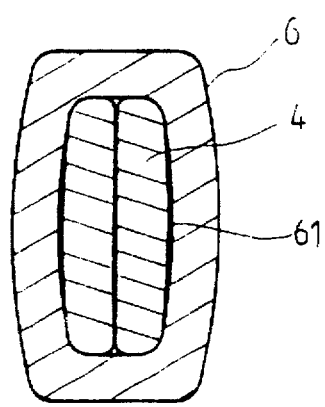
F I G. 2

SWIMMING GOGGLES

BACKGROUND OF THE INVENTION

1. Field of the Invention

A The present invention relates to a pair of swimming goggles which provides increased comfort during wearing.

2. Description of the Related Art

Swimming goggles may protect the swimmers' eyes and provide an increased view. FIG. 5 of the drawings illustrates a pair of conventional swimming goggles which includes two frames 72 of plastic material interconnected by a connecting member 73, two rigid lenses 71 respectively received in the frames 72, and a strap 74 which extends through two slots 721 respectively defined in outer sides of the frames 72, thereby defining an upper strap section 742 and a lower strap section 741 in which one of the strap sections, e.g., the upper strap section 742 has no buckle mounted thereto, while the lower strap section 741 has a buckle 75 mounted to an end thereof for adjustably embracing the head of the user (the two distal ends of the strap 74 may be directly knotted together if no buckle is provided). When in use, it often takes a considerable time for the user to adjust the length of the strap 74 (i.e., the length of the upper strap section 711 without buckle thereon) and to adjust the tightness of the upper and lower strap sections 742 and 741. The wound areas 743 of the strap 74 is not securely retained and thus may slide and thus exaggerate the difficulty of length adjustment of the strap 74. In addition, when in use, the lower strap section 741 may press against the ears of the users and thus result in discomfort, as shown in FIG. 6. Furthermore, the upper and lower strap sections 742 and 741 are relatively long and thus tend to entangle with each other which further exaggerates the difficulty of length adjustment of the strap 74.

Therefore, there has been a long and unfulfilled need for a pair of improved swimming goggles which mitigates and/or obviates the above-mentioned drawbacks.

SUMMARY OF THE INVENTION

A pair of swimming goggles in accordance with the present invention generally comprises two frames of plastic material interconnected by a connecting member therebetween, two rigid lenses respectively received in the frames, a strap, two clamping blocks each having a bore, and a buckle. Each frame includes a slot defined in an outer side thereof. The strap includes a first end, a second end, and a mediate section. Each of the first end and the second end of the strap is extended through the associated block, wound through the associated slot, and then again extended through the associated clamping block, thereby forming an upper strap section and a lower strap section which are adapted to be located at a position above the ears of a user. The first end and the second end of the strap are securely attached to the buckle, thereby allowing adjustment of the length of the strap in response to the shape of the head of the user. The bore of each clamping block allows the mediate section of the strap to be extended twice and thus tightly clamped therein.

By such an arrangement, the length of the strap can be easily adjusted in response to the shape of the user's head, thereby providing an increased comfort. In addition, the clamping blocks may retain the wound areas in position, thereby eliminating the difficulty of length adjustment of the strap. Furthermore, the lengths of the upper and lower strap sections are smaller than those in the conventional design, thereby eliminating entangling of the upper and lower strap sections as well as the difficulty of adjustment of the length of the strap. Preferably, the clamping block is made of buoyant material such that the swimming goggles may float on the water surface and thus be easily observed when lost in the water.

Other objects, advantages, and novel features of the invention will become more apparent from the following detailed description when taken in conjunction with the accompanying drawings.

BRIEF DESCRIPTION OF THE DRAWINGS

FIG. 2 is a cross sectional view of a clamping block of the swimming goggles in accordance with the present invention;

DESCRIPTION OF THE PREFERRED EMBODIMENT

Figure 1:
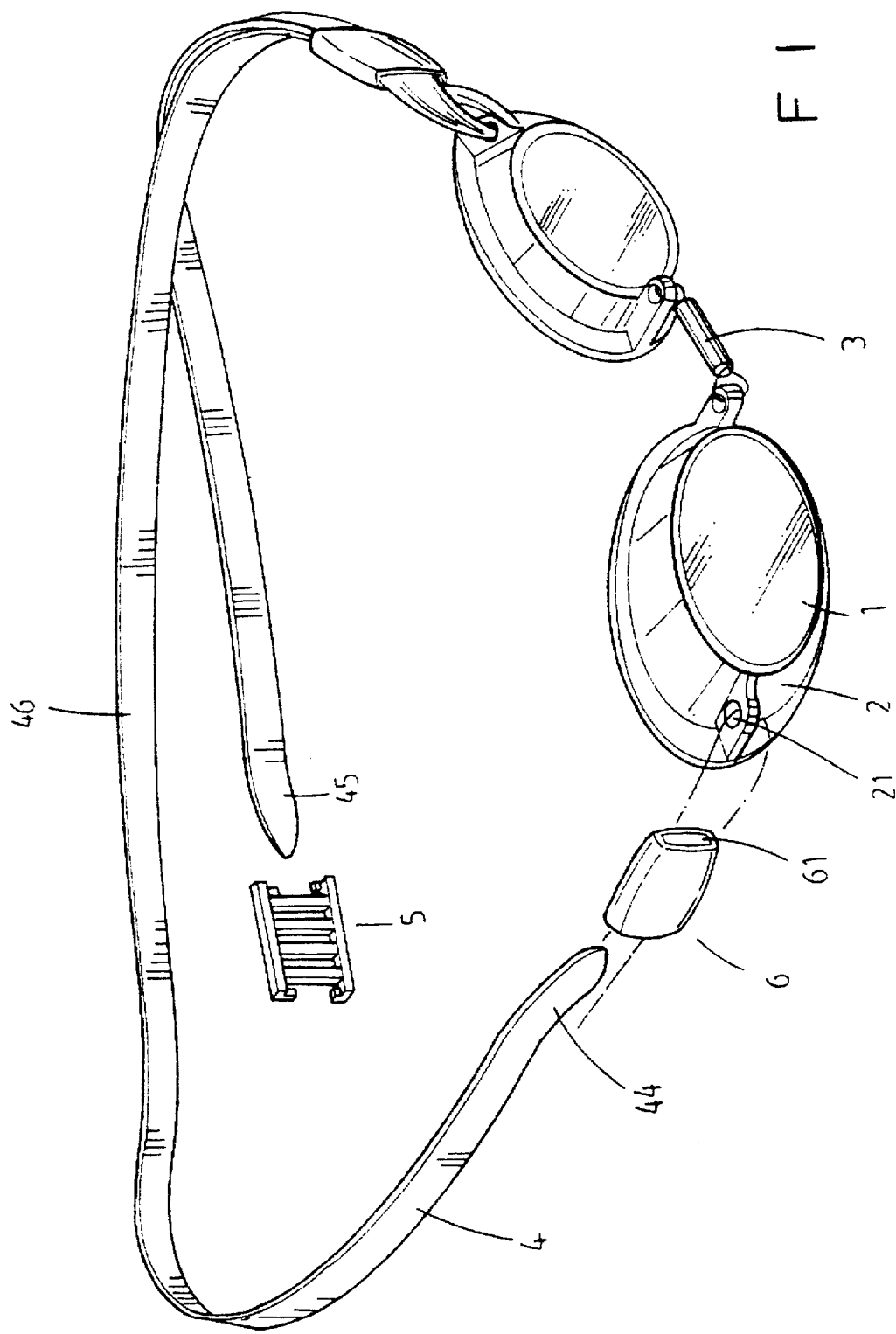
FIG. 1 is a perspective view, partly exploded, of a pair of swimming goggles in accordance with the present invention.
Figure 3:
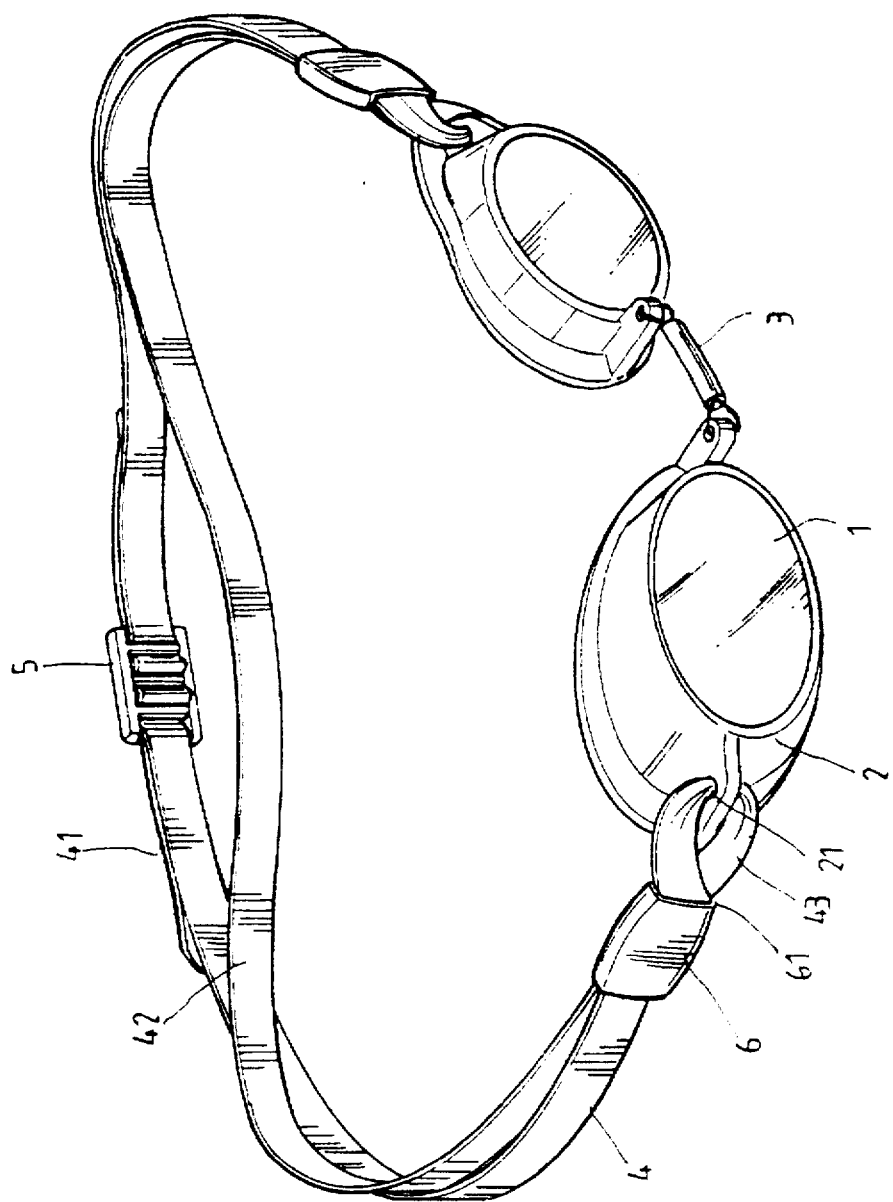
FIG. 3 is a perspective view of the swimming goggles of the present invention.

Referring to FIGS. 1 to 4 of the drawings and initially to FIGS. 1 to 3, a pair of swimming goggles in accordance with the present invention generally includes two frames 2 of plastic material interconnected by a connecting member 3 therebetween, two rigid lenses 1 respectively received in the frames 2, a strap 4, two clamping blocks 6 each having a bore 61, and a buckle 5. Each frame 2 includes a slot 21 defined in an outer side thereof. The strap 4 includes a first end 44, a second end 45, and a mediate section 46. Each end 44, 45 of the strap 4 (of elastic material) is extended through the associated block 6, wound through the associated slot 21, and then again extended through the associated clamping block 6, thereby forming an upper strap section 42 and a lower strap section 41 (see FIG. 3). The first end 44 and the second end 45 of the strap 4 are securely attached to the buckle 5, thereby allowing adjustment of the length of the strap 2 in response to the shape of the head of the user.

Figure 4:
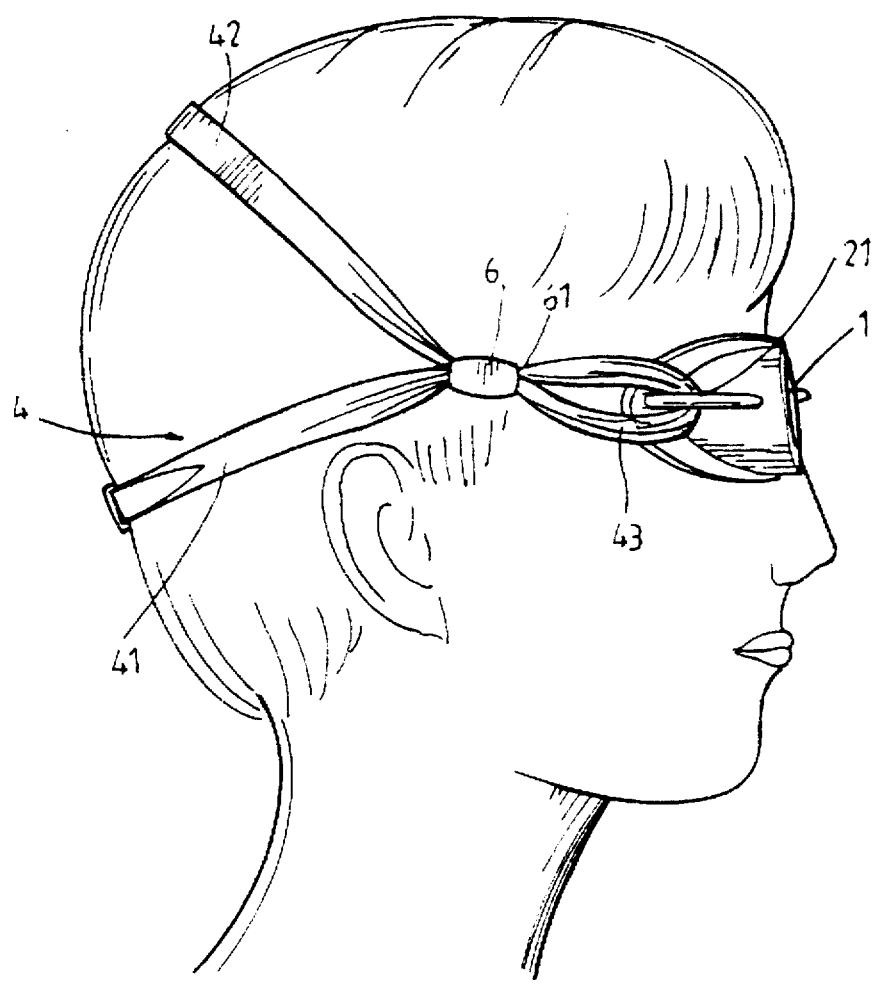
FIG. 4 is a schematic view illustrating the use of the swimming goggles of the present invention.
Figure 5:
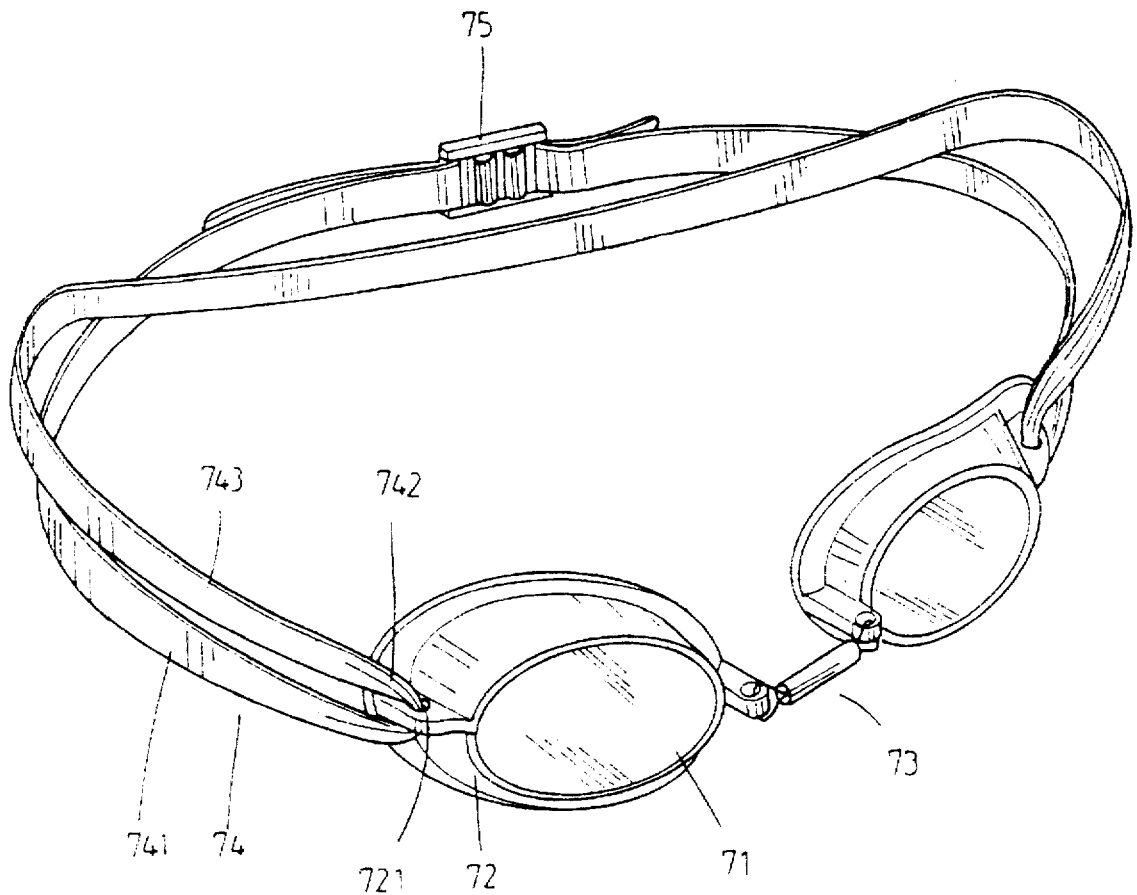
FIG. 5 is a perspective view, partly exploded, of a pair of conventional swimming goggles.
Figure 6:
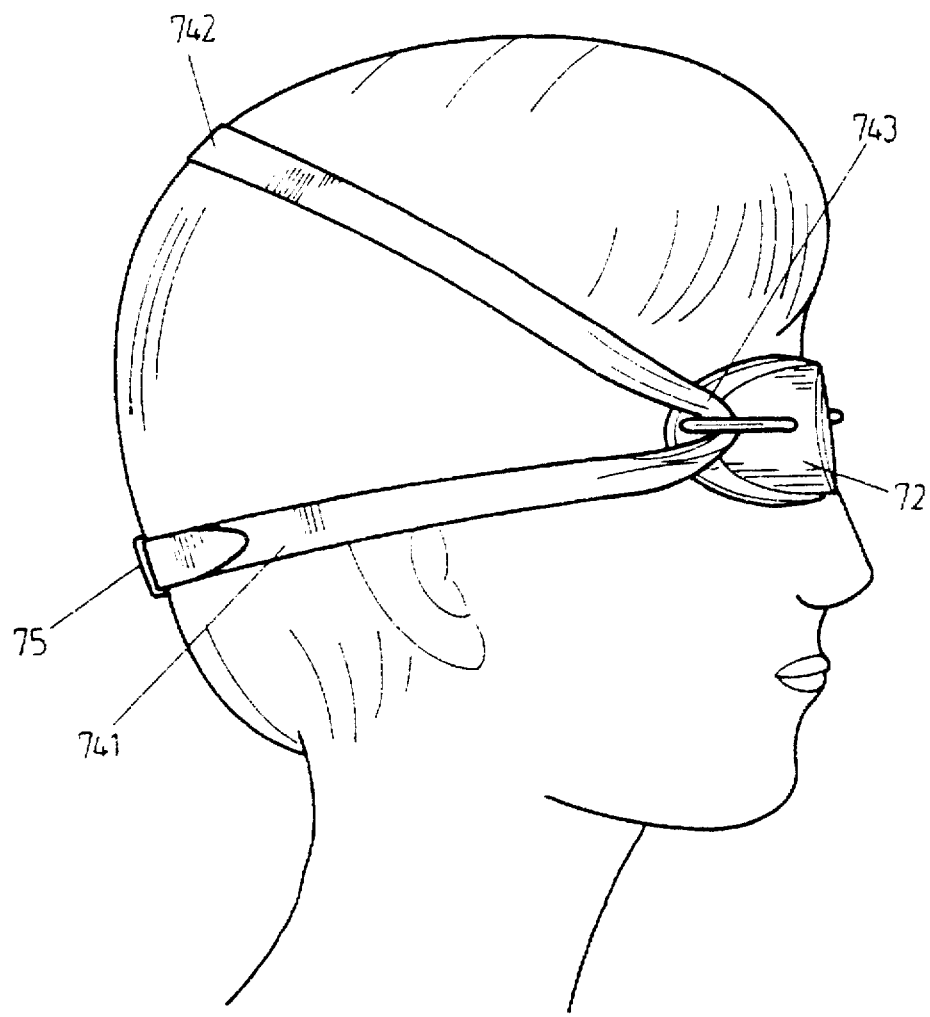
FIG. 6 is a schematic view illustrating the use of the swimming goggles of the conventional swimming goggles.

As shown in FIG. 2, the bore 61 of each clamping block 6 allows the mediate section 46 of the strap 4 may be extended twice and thus tightly clamped therein. Referring to FIG. 4, when in use, the ears of the user need not be pressed by the lower strap section 41, thereby providing an increased comfort. It is appreciated that the clamping blocks 6 may retain the wound areas 43 (see FIG. 3) in position, thereby eliminating the difficulty of adjustment of the length of the strap 4. In addition, the clamping blocks 6 may be made of buoyant material, such that the swimming goggles may float on the water surface when lost in the water.

Thus, the swimming goggles of the present invention has the following advantages:

(1) the length of the strap 4 can be easily adjusted in response to the shape of the user's head, thereby providing an increased comfort;

(2) the clamping blocks may retain the wound areas 43 in position, thereby eliminating the difficulty of adjustment of the length of the strap 4;

(3) the lengths of the upper and lower strap sections 41 and 42 are smaller than those in the conventional design, thereby eliminating entangling of the upper and lower strap sections as well as the difficulty of length adjustment of the strap 4; and (4) the clamping blocks are buoyant such that the swimming goggles may float on the water surface and thus be easily observed when lost in the water.

Although the invention has been explained in relation to its preferred embodiment, it is to be understood that many other possible modifications and variations can be made without departing from the spirit and scope of the invention as hereinafter claimed.

What is claimed is:

1. A pair of swimming goggles, comprising:

two frames of plastic material interconnected by a connecting member therebetween, two rigid lenses respectively received in the frames, a strap, two clamping blocks each having a bore, and a buckle, each said frame including a slot defined in an outer side thereof, the strap including a first end, a second end, and a mediate section, each of the first end and the second end of the strap being extended through the associated clamping block, wound through the associated slot, and then again extended through the associated clamping block, thereby forming an upper strap section and a lower strap section, the first end and the second end of the strap being securely attached to the buckle, thereby allowing adjustment of the length of the strap in response to the shape of the head of the user, said bore of each said clamping block allowing the mediate section of the strap to be extended twice and thus tightly clamped therein, each said clamping block retaining the upper strap section and the lower strap section adjacent to the wound portion at a position above the ears of a user.

2. The swimming goggles according to claim 1, wherein each said clamping block is made of buoyant material.

3. A swimming goggles apparatus comprising:

(1) a goggles assembly including a pair of frame members coupled together by a connecting member, each said frame member retaining a rigid lens and having defined thereon an outer side portion, each said outer side portion having a slot formed therein; and, (2) a strap assembly coupled to said goggles assembly for releasably securing said goggles to the head of a user, said strap assembly including:

(a) a strap member having opposed first and second ends and a mediate section extending therebetween, said strap member being looped through said outer side portion slot of both said frame members to define an upper strap section and a lower strap section extending from one of said frame members to the other when said first and second ends are coupled together;

(b) means for coupling together said first and second ends of said strap member; and, (c) at least a pair of clamping blocks adjustably coupled to said mediate section of said strap member, each said clamping block having formed therein a longitudinal bore receiving therethrough at least a portion of both said upper and lower strap sections, each said clamping block being displaceable relative to said upper and lower strap sections to adjustably adapt the configuration of said upper and lower strap sections to the user's head.

4. The swimming goggles apparatus as recited in claim 3, wherein each of said clamping blocks is formed of a subtantially buoyant material.

* * * * *